United States Patent
Guo et al.

(10) Patent No.: US 12,395,974 B2
(45) Date of Patent: Aug. 19, 2025

(54) COMMUNICATION METHOD, DEVICE, AND COMMUNICATIONS SYSTEM

(71) Applicant: HUAWEI TECHNOLOGIES CO., LTD., Guangdong (CN)

(72) Inventors: Yongkang Guo, Wuhan (CN); Tongbo Wang, Shanghai (CN); Haw-Wei Shu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 448 days.

(21) Appl. No.: 17/911,618

(22) PCT Filed: Mar. 19, 2021

(86) PCT No.: PCT/CN2021/081773
§ 371 (c)(1),
(2) Date: Sep. 14, 2022

(87) PCT Pub. No.: WO2021/185351
PCT Pub. Date: Sep. 23, 2021

(65) Prior Publication Data
US 2023/0119722 A1   Apr. 20, 2023

(30) Foreign Application Priority Data
Mar. 20, 2020 (CN) .......................... 202010203780.5

(51) Int. Cl.
*H04W 72/0453* (2023.01)
*H04W 72/543* (2023.01)

(52) U.S. Cl.
CPC ..... *H04W 72/0453* (2013.01); *H04W 72/543* (2023.01)

(58) Field of Classification Search
None
See application file for complete search history.

(56) References Cited

U.S. PATENT DOCUMENTS

| | | | |
|---|---|---|---|
| 2019/0215842 A1 | 7/2019 | Silverman et al. | |
| 2019/0254050 A1* | 8/2019 | Kusashima | H04W 92/20 |
| 2020/0120678 A1* | 4/2020 | Zhou | H04L 5/0064 |

FOREIGN PATENT DOCUMENTS

| | | |
|---|---|---|
| CN | 101754315 A | 6/2010 |
| CN | 102355432 A | 2/2012 |
| CN | 109699085 A | 4/2019 |
| CN | 209545887 U | 10/2019 |
| CN | 108886816 B | 3/2021 |
| WO | 2017092707 A1 | 6/2017 |
| WO | 2018191922 A1 | 10/2018 |

* cited by examiner

*Primary Examiner* — Walter J Divito

(57) ABSTRACT

This application provides a communication method, a device, and a communications system. The communications system includes a STA device and an AP device. The STA device sends an uplink packet to the AP device by using at least one basic channel element. The AP device detects uplink channel quality of the STA device, and sends a notification message to the STA device when the uplink channel quality meets a first preset condition, to indicate the STA device to send an uplink packet to the AP device by using a target frequency domain resource.

18 Claims, 5 Drawing Sheets

| Connection identification code (AID 12) | RU allocation (RU allocation) | Uplink forward error correction coding type (UL FEC coding type) | Uplink modulation and coding scheme (UL MCS) | Uplink dual-carrier modulation (UL DCM) | Synchronization signal allocation/ RA-RU information (SS allocation/ RA-RU information) | Uplink target signal strength (UL target RSSI) | Reserved (reserved) | Trigger dependent user information (trigger dependent user info) |
|---|---|---|---|---|---|---|---|---|

FIG. 4

COMMUNICATION METHOD, DEVICE, AND COMMUNICATIONS SYSTEM

CROSS-REFERENCE TO RELATED APPLICATIONS

This application is a national stage of International Application No. PCT/CN2021/081773, filed on Mar. 19, 2021, which claims priority to Chinese Patent application No. 202010203780.5, filed on Mar. 20, 2020, which is hereby incorporated by reference in its entirety.

TECHNICAL FIELD

This application relates to the communication field, and in particular, to a communication method, a device, and a communications system.

BACKGROUND

With gradual evolution of a wireless local area network (wireless local access network, WLAN) technology, the institute of electrical and electronics engineers (institute of electrical and electronic engineers, IEEE) releases a next-generation WLAN standard 802.11ax referred to as a high efficiency WLAN (high efficiency WLAN, HEW), to further improve a sending performance of a WLAN in a dense user scenario.

Currently, a communication distance between Wi-Fi devices is subject to indicators such as transmit power and power spectrum density of a Wi-Fi device, and receiver sensitivity of a peer device. In a same use scenario, a device with higher transmit power and higher power spectrum density is at a longer communication distance than a device with lower transmit power and lower power spectrum density. Because transmit power of an access point (access point, AP) device is overall greater than transmit power of a station (STA) device such as a mobile phone or a tablet computer, when the STA device is relatively far away from the AP device, the STA device can discover the AP device and receive downlink data sent by the AP device. However, because the uplink transmit power of the STA device is relatively low, the AP device cannot receive an uplink packet sent by the STA device, and consequently the STA device cannot access the AP device.

SUMMARY

This application provides a communication method, a device, and a communications system, to improve a Wi-Fi signal coverage distance in an uplink direction, and expand a signal coverage area of a Wi-Fi device.

According to a first aspect, this application provides a communications system. The communications system may be applied to a WLAN. Currently, a standard used in the WLAN is an IEEE 802.11ax series, and a plurality of Wi-Fi standards such as 802.11ax, 802.11ac, 802.11n, 802.11g, 802.11b, and 802.11a may be further supported. The communications system may include a STA device and an AP device, and the STA device establishes a Wi-Fi connection to the AP device. First, the STA device sends an uplink packet to the AP device by using at least one basic channel element. Then, the AP device detects uplink channel quality of the STA device, and sends a notification message to the STA device when the uplink channel quality meets a first preset condition, to indicate the STA device to send an uplink packet to the AP device by using a target frequency domain resource.

Herein, the target frequency domain resource is at least a part of one basic channel element.

In this application, the target frequency domain resource is at least a part of one basic channel element, that is, a bandwidth of the target frequency domain resource is less than a bandwidth of one basic channel element, and the target frequency domain resource may be understood as a narrowband resource.

The uplink packet may include a data type packet, a management type packet, and/or a control type packet specified in the 802.11ax standard.

A resource type of the target frequency domain resource may include at least one of the following: a resource unit (resource unit, RU) that includes 26 subcarriers, an RU that includes 52 subcarriers, an RU that includes 106 subcarriers, or an RU that includes 242 subcarriers.

In this application, when detecting that the uplink channel quality is relatively poor, the AP device allocates the target frequency domain resource with a smaller bandwidth to the STA device, so that the STA device can send an uplink packet on the specified target frequency domain resource. Therefore, on a premise that transmit power of the STA device remains unchanged, uplink power spectrum density can be improved, and receiver sensitivity of the AP device can be reduced, thereby improving a Wi-Fi signal coverage distance in an uplink direction, and expanding a signal coverage area of a Wi-Fi device.

Based on the first aspect, in some possible implementations, the AP device is further configured to: when the uplink channel quality meets the first preset condition, send a first control message to the STA device, where the first control message is used to indicate the STA device to stop sending an uplink packet to the AP device by using the at least one basic channel element.

Based on the first aspect, in some possible implementations, the first preset condition includes at least one of the following: received signal strength indicator of the STA device falls within a first preset threshold range, a packet loss rate of a downlink packet sent by the AP device to the STA device or a bit error rate of the downlink packet is greater than a first preset threshold, or a signal-to-noise ratio of an uplink channel of the STA device is less than a second preset threshold, where the packet loss rate of the downlink packet or the bit error rate of the downlink packet is determined by the AP device when the AP device receives no acknowledgment message sent by the STA device.

Based on the first aspect, in some possible implementations, the AP device is further configured to: when the uplink channel quality meets a second preset condition, send a second control message to the STA device, where the second control message is used to indicate the STA device to send an uplink packet to the AP device by using the at least one basic channel element.

Based on the first aspect, in some possible implementations, the second preset condition includes at least one of the following: received signal strength indicator of the STA device falls within a second preset threshold range, a packet loss rate of a downlink packet sent by the AP device to the STA device or a bit error rate of the downlink packet is less than or equal to the first preset threshold, or a signal-to-noise ratio of the uplink channel of the STA device is greater than or equal to the second preset threshold, where the first preset threshold range is different from the second preset threshold range.

Based on the first aspect, in some possible implementations, a resource type of the target frequency domain resource includes at least one of the following: an RU that includes 26 subcarriers, an RU that includes 52 subcarriers, an RU that includes 106 subcarriers, or an RU that includes 242 subcarriers.

According to a second aspect, this application provides a communication method. The communication method may be applied to the AP device according to the first aspect and the possible implementations of the first aspect in a WLAN. Currently, a standard used in the WLAN is an IEEE 802.11ax series, and a plurality of Wi-Fi standards such as 802.11ax, 802.11ac, 802.11n, 802.11g, 802.11b, and 802.11a may be further supported. First, the AP device receives, by using at least one basic channel element, an uplink packet sent by a STA device. Then, the AP device detects uplink channel quality of the STA device, and allocates a target frequency domain resource to the STA device when the uplink channel quality meets a first preset condition. Next, the AP device sends a notification message to the STA device, to notify the STA device of a resource type of the target frequency domain resource, a location of the target frequency domain resource in the basic channel element, or the like. Next, the STA device sends, in response to the notification message, an uplink packet to the AP device based on an indication of the AP device by using the target frequency domain resource.

In this application, the target frequency domain resource is at least a part of one basic channel element, that is, a bandwidth of the target frequency domain resource is less than a bandwidth of one basic channel element, and the target frequency domain resource may be understood as a narrowband resource.

The uplink packet may include a data type packet, a management type packet, and/or a control type packet specified in the 802.11ax standard.

The resource type of the target frequency domain resource includes at least one of the following: an RU that includes 26 subcarriers, an RU that includes 52 subcarriers, an RU that includes 106 subcarriers, or an RU that includes 242 subcarriers.

In this application, when detecting that the uplink channel quality is relatively poor, the AP device allocates the target frequency domain resource with a smaller bandwidth to the STA device, so that the STA device can send an uplink packet on the specified target frequency domain resource. Therefore, on a premise that transmit power of the STA device remains unchanged, uplink power spectrum density can be improved, and receiver sensitivity of the AP device can be reduced, thereby improving a Wi-Fi signal coverage distance in an uplink direction, and expanding a signal coverage area of a Wi-Fi device.

Based on the second aspect, in some possible implementations, a representation parameter of the uplink channel quality includes: received signal strength indicator of the STA device, a packet loss rate of a downlink packet sent by the AP device to the STA device, a bit error rate of the downlink packet, or a signal-to-noise ratio of an uplink channel of the STA device, where the packet loss rate of the downlink packet or the bit error rate of the downlink packet is determined by the AP device when the AP device receives no acknowledgment message sent by the STA device.

In this application, after the AP device sends a downlink packet to the STA device, the STA device sends an acknowledgment message to the AP device, to notify the AP device of data received by the STA device. However, when the uplink channel quality is relatively poor, the AP device possibly cannot receive the acknowledgment message sent by the STA device. In this case, the AP device considers that the downlink packet sent this time is lost or incorrectly decoded. Therefore, the AP device can determine a packet loss rate or a bit error rate of the downlink packet.

Based on the second aspect, in some possible implementations, the representation parameter of the uplink channel quality is the received signal strength indicator of the STA device, and that the AP device allocates a target frequency domain resource to the STA device when the uplink channel quality meets a first preset condition includes: when the received signal strength indicator of the STA device falls within a first preset threshold range, the AP device determines a resource type corresponding to the first preset threshold range; and the AP device allocates a target frequency domain resource of the resource type to the STA device.

Based on the second aspect, in some possible implementations, the representation parameter of the uplink channel quality is the packet loss rate or the bit error rate of the downlink packet, and that the AP device allocates a target frequency domain resource to the STA device when the uplink channel quality meets a preset condition includes: when the packet loss rate or the bit error rate of the downlink packet is greater than a first preset threshold, the AP device determines a target resource type from a plurality of preset resource types, where each of the plurality of resource types corresponds to a different bandwidth, and a bandwidth corresponding to the target source type is less than only a bandwidth corresponding to a current resource type of the STA device; and the AP device allocates a target frequency domain resource of the target resource type to the STA device.

Based on the second aspect, in some possible implementations, the method further includes: when the uplink channel quality meets the first preset condition, the AP device sends configuration information of the target frequency domain resource to the STA device by using the notification message, where the configuration information includes at least a modulation and coding scheme MCS and/or dual carrier modulation DCM; and that the AP device receives an uplink packet sent by the STA device on the target frequency domain resource includes: the AP device pares, on the target frequency domain resource based on the configuration information corresponding to the target frequency domain resource, the uplink packet sent by the STA device.

Based on the second aspect, in some possible implementations, after that the AP device sends a notification message to the STA device, the method further includes: the AP device receives, by using the target frequency domain resource, the uplink packet sent by the STA device; and when the received uplink packet is empty, the AP device prolongs a sending period of the notification message, and sends the notification message to the STA device again based on a prolonged sending period.

Based on the second aspect, in some possible implementations, after that the AP device receives, by using the target frequency domain resource, the uplink packet sent by the STA device, the method further includes: when the received uplink packet is not the last fragment of a to-be-sent uplink packet, the AP device sends the notification message to the STA device again, where the to-be-sent uplink packet is an entire packet to be sent by the STA device to the AP device.

Based on the second aspect, in some possible implementations, the method further includes: when the uplink channel quality meets the first preset condition, the AP device sends a first control message to the STA device, where the first control message is used to indicate the STA device to stop sending an uplink packet to the AP device by using the at least one basic channel element; or when the uplink channel quality meets a second preset condition, the AP device sends a second control message to the STA device, where the second control message is used to indicate the STA device to send an uplink packet to the AP device by using the at least one basic channel element.

According to a third aspect, this application provides a communication method. The communication method may be applied to the STA device according to the first aspect and the possible implementations of the first aspect in a WLAN. Currently, a standard used in the WLAN is an IEEE 802.11ax series, and a plurality of Wi-Fi standards such as 802.11ax, 802.11ac, 802.11n, 802.11g, 802.11b, and 802.11a may be further supported. The STA device sends an uplink packet to an AP device by using at least one basic channel element; the STA device receives a notification message sent by the access point AP device; and the STA device sends, in response to the notification message, an uplink packet to the AP device by using a target frequency domain resource allocated by the AP device, where the target frequency domain resource is at least a part of one basic channel element.

Based on the third aspect, in some possible implementations, that the STA device sends an uplink packet to the AP device by using a target frequency domain resource allocated by the AP device includes: the STA device calculates a length of a single-time schedulable packet based on a resource type of the target frequency domain resource; and when a length of a to-be-sent uplink packet is greater than the length of the single-time schedulable packet, the STA device fragments the to-be-sent uplink packet, and sends a packet fragment to the AP device by using the target frequency domain resource.

Based on the third aspect, in some possible implementations, the method further includes: the STA device receives a first control message sent by the AP device; and the STA device stops, in response to the first control message, sending an uplink packet to the AP device by using the at least one basic channel element.

Based on the third aspect, in some possible implementations, the method further includes: the STA device receives a second control message sent by the AP device; and the STA device sends, in response to the second control message, an uplink packet to the AP device by using the at least one basic channel element.

Based on the third aspect, in some possible implementations, the uplink packet includes a management type packet and/or a control type packet specified in the 802.11ax standard.

Based on the third aspect, in some possible implementations, the resource type of the target frequency domain resource includes at least one of the following: an RU that includes 26 subcarriers, an RU that includes 52 subcarriers, an RU that includes 106 subcarriers, or an RU that includes 242 subcarriers.

According to a fourth aspect, this application provides a communications apparatus. The communications apparatus may be a chip or a system-on-a-chip in an AP device, or may be a functional module configured to implement the method in the foregoing embodiment in the AP device. The communications apparatus may include: a first receiving module, configured to receive, by using at least one basic channel element, an uplink packet sent by a STA device; a first processing module, configured to: detect uplink channel quality of the STA device, and allocate a target frequency domain resource to the STA device when the uplink channel quality meets a first preset condition, where the target frequency domain resource is at least a part of one basic channel element; and a first sending module, configured to send a notification message to the STA device, where the notification message is used to indicate the STA device to send an uplink packet to the AP device by using the target frequency domain resource.

Based on the fourth aspect, in some possible implementations, a representation parameter of the uplink channel quality includes: received signal strength indicator of the STA device, a packet loss rate of a downlink packet sent by the AP device to the STA device, a bit error rate of the downlink packet, or a signal-to-noise ratio of an uplink channel of the STA device, where the packet loss rate of the downlink packet or the bit error rate of the downlink packet is determined by the AP device when the AP device receives no acknowledgment message sent by the STA device.

Based on the fourth aspect, in some possible implementations, the representation parameter of the uplink channel quality is the received signal strength indicator of the STA device, and the first processing module is specifically configured to: when the received signal strength indicator of the STA device falls within a first preset threshold range, determine a resource type corresponding to the first preset threshold range; and allocate the target frequency domain resource of the resource type to the STA device.

Based on the fourth aspect, in some possible implementations, the representation parameter of the uplink channel quality is the packet loss rate or the bit error rate of the downlink packet, and the first processing module is specifically configured to: when the packet loss rate or the bit error rate of the downlink packet is greater than a first preset threshold, determine a target resource type from a plurality of preset resource types, where each of the plurality of resource types corresponds to a different bandwidth, and a bandwidth corresponding to the target source type is less than only a bandwidth corresponding to a current resource type of the STA device; and allocate a target frequency domain resource of the target resource type to the STA device.

Based on the fourth aspect, in some possible implementations, the first processing module is further configured to: when the uplink channel quality meets the first preset condition, send configuration information of the target frequency domain resource to the STA device by using the notification message, where the configuration information includes at least a modulation and coding scheme MCS and/or dual carrier modulation DCM; and receiving an uplink packet sent by the STA device on the target frequency domain resource includes: paring, on the target frequency domain resource based on the configuration information corresponding to the target frequency domain resource, the uplink packet sent by the STA device.

Based on the fourth aspect, in some possible implementations, the first receiving module is further configured to: after the first sending module sends the notification message to the STA device, receive, by using the target frequency domain resource, the uplink packet sent by the STA device; the first processing module is further configured to: when the received uplink packet is empty, prolong a sending period of the notification message; and the first sending module is further configured to send the notification message to the STA device again based on a prolonged sending period.

Based on the fourth aspect, in some possible implementations, the first sending module is further configured to: after the first receiving module receives, by using the target frequency domain resource, the uplink packet sent by the STA device, when the received uplink packet is not the last fragment of a to-be-sent uplink packet, send the notification message to the STA device again, where the to-be-sent uplink packet is an entire packet to be sent by the STA device to the AP device.

Based on the fourth aspect, in some possible implementations, the first sending module is further configured to: when the uplink channel quality meets the first preset condition, send a first control message to the STA device, where the first control message is used to indicate the STA device to stop sending an uplink packet to the AP device by using the at least one basic channel element; or when the uplink channel quality meets a second preset condition, send a second control message to the STA device, where the second control message is used to indicate the STA device to send an uplink packet to the AP device by using the at least one basic channel element.

Based on the fourth aspect, in some possible implementations, the uplink packet includes a management type packet and/or a control type packet specified in the 802.11ax standard.

Based on the fourth aspect, in some possible implementations, a resource type of the target frequency domain resource includes at least one of the following: an RU that includes 26 subcarriers, an RU that includes 52 subcarriers, an RU that includes 106 subcarriers, or an RU that includes 242 subcarriers.

According to a fifth aspect, this application provides a communications apparatus. The communications apparatus may be a chip or a system-on-a-chip in a STA device, or may be a functional module configured to implement the method in the foregoing embodiment in the STA device. The Wi-Fi communications apparatus may include: a second sending module, configured to send an uplink packet to an AP device by using at least one basic channel element; and a second receiving module, configured to receive a notification message sent by the AP device, where the second sending module is further configured to: send, in response to the notification message, an uplink packet to the AP device by using a target frequency domain resource allocated by the AP device, where the target frequency domain resource is at least a part of one basic channel element.

Based on the fifth aspect, in some possible implementations, the apparatus further includes: a second processing module, configured to: calculate a length of a single-time schedulable packet based on a resource type of the target frequency domain resource; and when a length of a to-be-sent uplink packet is greater than the length of the single-time schedulable packet, fragment the to-be-sent uplink packet; and the second sending module is further configured to send a packet fragment to the AP device by using the target frequency domain resource.

Based on the fifth aspect, in some possible implementations, the second receiving module is further configured to receive a first control message sent by the AP device; and the second sending module is further configured to stop, in response to the first control message, sending an uplink packet to the AP device by using the at least one basic channel element.

Based on the fifth aspect, in some possible implementations, the second receiving module is configured to receive a second control message sent by the AP device; and the second sending module is further configured to send, in response to the second control message, an uplink packet to the AP device by using the at least one basic channel element.

Based on the fifth aspect, in some possible implementations, the uplink packet includes a management type packet and/or a control type packet specified in the 802.11ax standard.

Based on the fifth aspect, in some possible implementations, the resource type of the target frequency domain resource includes at least one of the following: an RU that includes 26 subcarriers, an RU that includes 52 subcarriers, an RU that includes 106 subcarriers, or an RU that includes 242 subcarriers.

According to a sixth aspect, this application provides an AP device, including a processor and a communications interface. The processor is coupled to a memory; the processor is configured to read and execute instructions in the memory, to implement the communication method according to any one of the first aspect, the second aspect, and the possible implementations of the first aspect and the second aspect; and the communications interface is configured to communicate with a STA device.

Based on the sixth aspect, in some possible implementations, the AP device further includes the memory, configured to store necessary computer-executable instructions and data of the AP device. When the AP device runs, the processor executes the computer-executable instructions stored in the memory, to enable the AP device to perform the communication method according to any one of the first aspect, the second aspect, and the possible implementations of the first aspect and the second aspect.

According to a seventh aspect, this application provides a STA device, including a processor and a communications interface. The processor is coupled to a memory; the processor is configured to read and execute instructions in the memory, to implement the communication method according to any one of the first aspect, the third aspect, and the possible implementations of the first aspect and the third aspect; and the communications interface is configured to communicate with an AP device.

Based on the seventh aspect, in some possible implementations, the STA device further includes the memory, configured to store necessary computer-executable instructions and data of the STA device. When the STA device runs, the processor executes the computer-executable instructions stored in the memory, to enable the STA device to perform the communication method according to any one of the first aspect, the third aspect, and the possible implementations of the first aspect and the third aspect.

According to an eighth aspect, this application provides a computer-readable storage medium. The computer-readable storage medium stores instructions. When the instructions run on a computer, the communication method according to any one of the first aspect, the second aspect, the third aspect, and the possible implementations of the first aspect, the second aspect, and the third aspect is performed.

According to a ninth aspect, this application provides a computer program or a computer program product. When the computer program or the computer program product is executed on a computer, the computer is enabled to implement the communication method according to any one of the first aspect, the second aspect, the third aspect, and the possible implementations of the first aspect, the second aspect, and the third aspect.

It should be understood that, technical solutions in the fourth to the ninth aspects of this application are consistent with those of the first to the third aspects of this application. Beneficial effects achieved by these aspects and corresponding feasible implementations are similar, and details are not described again.

BRIEF DESCRIPTION OF DRAWINGS

To describe technical solutions in embodiments of this application or in the background more clearly, the following describes the accompanying drawings used in embodiments of this application or in the background.

FIG. 4 is a schematic diagram of a user info field according to an embodiment of this application;

DESCRIPTION OF EMBODIMENTS

Figure 1:
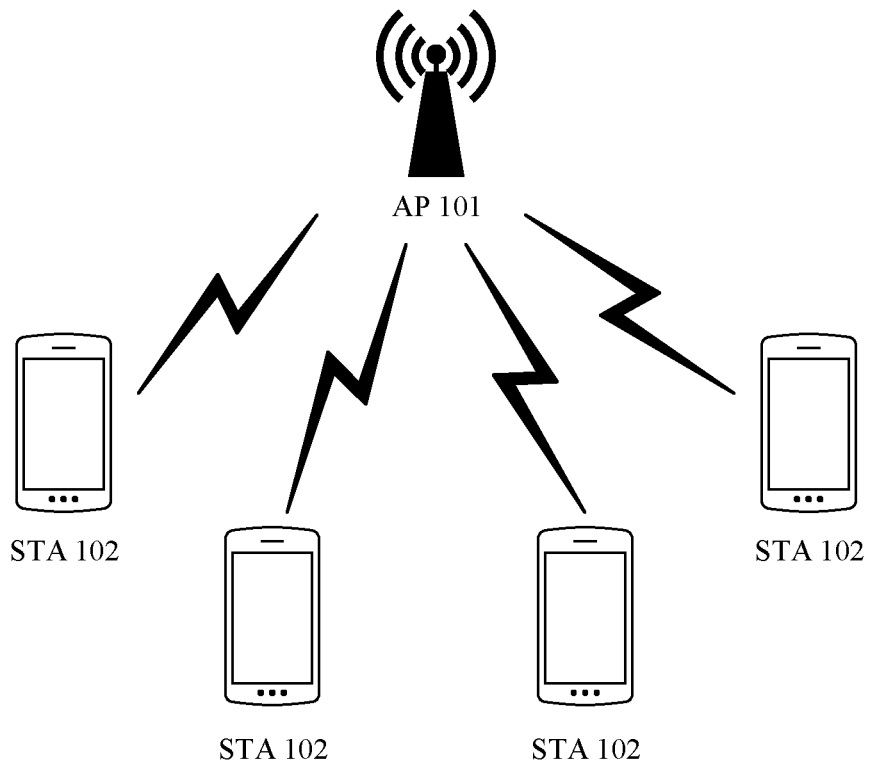
FIG. 1 is a schematic diagram of a system in a typical WLAN deployment scenario according to an embodiment of this application.

The following describes embodiments of this application with reference to the accompanying drawings in embodiments of this application. In the following description, reference is made to the accompanying drawings that form a part of this application and that illustrate specific aspects of embodiments of this application or can be used in the specific aspects of embodiments of this application. It should be understood that embodiments of this application may be used in other aspects, and may include structural or logical changes not depicted in the accompanying drawings. For example, it should be understood that the disclosure with reference to the described method may also be applied to a corresponding device or system for performing the method, and vice versa. For example, if one or more specific method steps are described, a corresponding device may include one or more units such as function units for performing the described one or more method steps (for example, one unit performs the one or more steps, or each of a plurality of units performs one or more of the plurality of steps), even if such one or more units are not explicitly described or illustrated in the accompanying drawings. In addition, for example, if a specific apparatus is described based on one or more units such as a function unit, a corresponding method may include one step for implementing functionality of one or more units (for example, one step implements functionality of one or more units, or each of a plurality of steps implements functionality of one or more units in the plurality of units), even if such one or more of steps are not explicitly described or illustrated in the accompanying drawings. Further, it should be understood that the features of the various example embodiments and/or aspects described in this specification may be combined with each other, unless otherwise specified.

Embodiments of this application may be applied to a WLAN. Currently, a standard used in the WLAN is an IEEE 802.11ax series, also referred to as Wi-Fi 6. The WLAN may include a plurality of basic service sets (basic service set, BSS). Network nodes in the BSS include an access point node, namely, an AP device, and a non-access-point node, namely, a STA device. Each BSS may include one AP device and a plurality of STA devices associated with the AP device.

The access point node is also referred to as a wireless access point, a hotspot, or the like. AP devices are mainly deployed inside a home, a building, and a park. A typical coverage radius is tens of meters to hundreds of meters. The AP device is equivalent to a bridge that connects a wired network and a wireless network. The AP device is mainly configured to connect various wireless network clients together and then connect the wireless network to the Ethernet. Specifically, the AP device may be a terminal device with a Wi-Fi chip, such as a mobile phone, a tablet computer, a laptop computer, or a workstation that supports a Wi-Fi hotspot function. Alternatively, the AP device may be a network device with a Wi-Fi chip, such as a router or customer-premises equipment (Customer Premise Equipment, CPE). The AP device can support a plurality of Wi-Fi standards such as 802.11ax, 802.11ac, 802.11n, 802.11g, 802.11b, and 802.11a.

The non-access-point node, namely, the STA device, may be a wireless communications chip, a wireless sensor, or a wireless communications terminal. Specifically, for example, the STA device may be a smartphone, a tablet computer, or a personal computer that supports a Wi-Fi communication function, the STA device may be a set-top box or a smart TV that supports a Wi-Fi communication function, the STA device may be an intelligent wearable device that supports a Wi-Fi communication function, or the STA device may be an in-vehicle communications device that supports a Wi-Fi communication function, or an unmanned aerial vehicle that supports a Wi-Fi communication function. The STA device can support a plurality of Wi-Fi standards such as 802.11ax, 802.11ac, 802.11n, 802.11g, 802.11b, and 802.11a.

First, it should be noted that an operating frequency band of a Wi-Fi device is divided into 13 basic channel elements, and a bandwidth of each basic channel element is 22 MHz. In the 802.11ax standard, an orthogonal frequency division multiple access (orthogonal frequency division multiple access, OFDMA) technology is introduced, to divide one basic channel element into smaller sub-channels that each have a predetermined quantity of subcarriers. These smaller sub-channels may be referred to as "resource units" (resource unit, RU). For example, one basic channel element (equivalent to a 22 MHz bandwidth) in the 802.11ax standard is divided into a plurality of RUs, and each RU includes at least 26 subcarriers (equivalent to a 2 MHz bandwidth). In this way, in a high-density access environment, an OFDMA mechanism can simultaneously provide smaller (but dedicated) sub-channels for a plurality of users, thereby improving an average transmission rate of each user.

In embodiments of this application, when a frequency domain resource is the RU, a resource type, namely, an RU type (RU type), may be a (242-tone) (equivalent to a 20 MHz bandwidth) RU that includes 242 subcarriers, a 106-tone (equivalent to a 10 MHz bandwidth) RU, a 52-tone (equivalent to a 5 MHz bandwidth) RU, a 26-tone RU, or the like. Bandwidths corresponding to these RU types may be referred to as "narrowband channels" relative to the bandwidth of the basic channel element. In a specific implementation, an AP device may negotiate an RU type set with a STA device in advance. The set may include some or all of the plurality of RU types, and each RU type in the RU type set corresponds to a different bandwidth. A packet may be transmitted between the AP device and the STA device on a specified RU.

In addition, a plurality of "narrowband" frequency domain resources may be alternatively customized, and a frequency domain resource in one basic channel element is divided into smaller sub-channels. When the frequency domain resource is these smaller sub-channels, a resource type, namely, a channel type, may include 2 MHz, 5 MHz, 10 MHz, 20 MHz, or the like. Similarly, an AP device may negotiate a channel type set with a STA device in advance, and the set may include some or all of the plurality of channel types. A packet may be transmitted between the AP device and the STA device on a specified sub-channel. In actual application, a bandwidth of the sub-channel may be alternatively another bandwidth less than 20 MHz. This is not specifically limited in this embodiment of this application.

FIG. 1 is a schematic diagram of a system in a typical WLAN deployment scenario according to an embodiment of this application. Referring to FIG. 1, a communications system 100 includes one AP device 101 and four STA devices 102, and the AP device 101 separately communicates with the four STA devices 102.

A communication distance between the STA device and the AP device is subject to indicators such as transmit power and power spectrum density of the device. In a same use scenario, a device with higher transmit power and higher power spectrum density is at a longer communication distance than a device with lower transmit power and lower power spectrum density. Because transmit power of the AP device is overall greater than transmit power of the STA device, when the STA device is relatively far away from the AP device, the STA device can discover the AP device and receive downlink data sent by the AP device. However, because the uplink transmit power of the STA device is relatively low, the AP device cannot receive an uplink packet sent by the STA device, and consequently the STA device cannot access the AP device. In this case, the uplink transmit power of the STA device may be improved by improving transmit power, sensitivity, or the like of a Wi-Fi chip in the STA device, by improving an antenna gain, or by using components such as a power amplifier (power amplifier, PA), a low noise amplifier (low noise amplifier, LNA), and a front-end module (front-end modules, FEM). However, in this way, the improvement is subject to a technical specification indicator that can be achieved by a hardware component and costs of the hardware component. Therefore, how to improve a Wi-Fi signal coverage distance in an uplink direction and expand a signal coverage area of a Wi-Fi device when transmit power of a STA device remains unchanged is a problem to be urgently resolved.

In embodiments of this application, to resolve the foregoing problem, a communication method is provided. The communication method is applied to the foregoing communications system. Herein, the communication method is described by using an example in which the communications system includes one AP device and one STA device, and a frequency domain resource is an RU.

Figure 2:
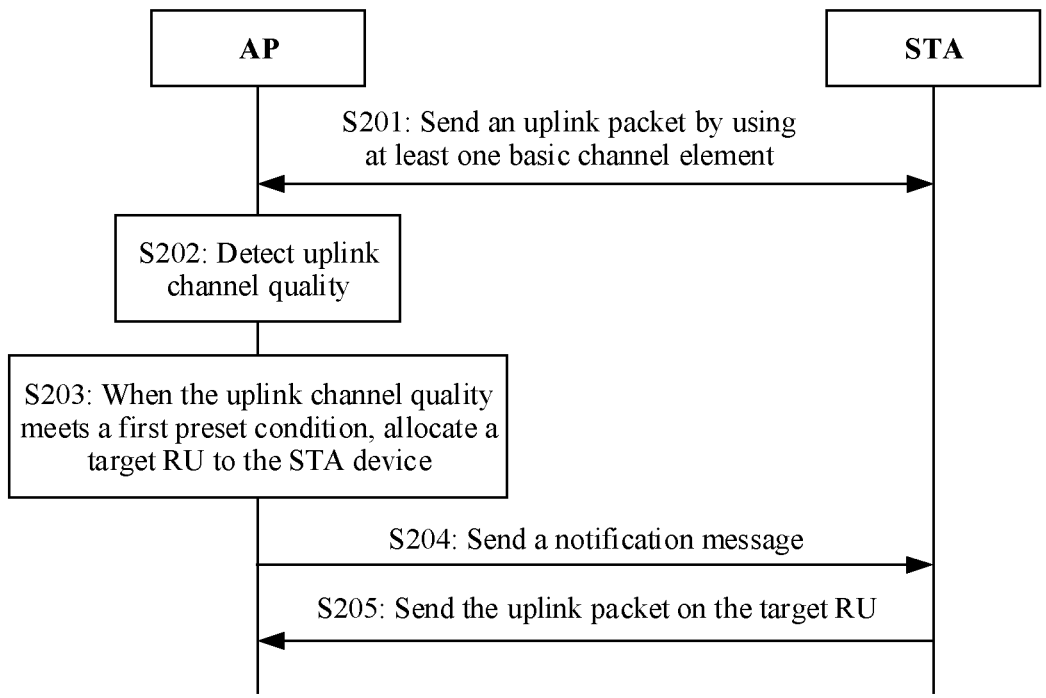
FIG. 2 is a schematic diagram of an implementation procedure of a communication method according to an embodiment of this application.

FIG. 2 is a schematic diagram of an implementation procedure of a communication method according to an embodiment of this application. Referring to FIG. 2, the method includes the following steps.

S201: A STA device sends an uplink packet to an AP device by using at least one basic channel element.

After the AP device establishes a Wi-Fi connection to the STA device, the AP device performs packet transmission with the STA device on the at least one basic channel element. In this case, a bandwidth of the at least one basic channel element may be 22 MHz, 44 MHz, 66 MHz, 80 MHz, or the like.

S202: The AP device detects uplink channel quality of the STA device.

In a process of performing S201 to communicate with the STA device, the AP device may periodically detect the uplink channel quality of the STA device. In actual application, when performing S202, the AP device may detect the uplink channel quality of the STA device periodically, for example, at an interval of 5 ms, 10 ms, or 25 ms, to prevent signaling interaction between the AP device and the STA device from being frequent to occupy a link bandwidth.

The uplink channel quality may include received signal strength indicator of the STA device, a packet loss rate of a downlink packet sent by the AP device to the STA device, a bit error rate of the downlink packet, a signal-to-noise ratio of an uplink channel of the STA device, or the like. Certainly, the AP device may alternatively detect other indicators, provided that these indicators can represent the uplink channel quality of the STA device. This is not specifically limited in this embodiment of this application.

S203: When the uplink channel quality meets a first preset condition, the AP device allocates a target frequency domain resource, namely, a target RU, to the STA device.

Corresponding to different cases of the uplink channel quality of the STA device, the first preset condition may be that the received signal strength indicator (received signal strength indication, RSSI) of the STA device falls within a preset threshold range 1 or is lower than a preset threshold 1, that the packet loss rate or the bit error rate of the downlink packet is greater than a preset threshold 2, that the signal-to-noise ratio of the uplink channel of the STA device is lower than a preset threshold 3, or another condition used to indicate that the uplink channel quality of the STA device does not meet a packet transmission requirement. This is not specifically limited in this embodiment of this application.

In this embodiment of this application, in S203, when a representation parameter of the uplink channel quality is the received signal strength indicator of the STA device, the first preset condition may be that a value of the RSSI of the STA device falls within the preset threshold range 1. Herein, to improve power spectrum density, the AP device may set different preset threshold ranges 1 for a plurality of preset resource types. When the RSSI of the STA device falls within a preset threshold range 1, the AP device may allocate a target frequency domain resource of a corresponding resource type to the STA device.

For example, in different coding/decoding types or bit rates, or different bandwidths, the AP device has different requirements for minimum received signal power, namely, minimum receiver sensitivity (unit: dBm), that is of an antenna port and that is required for normal operation of the AP device. It is assumed that, for example, a frequency domain resource is an RU, and a plurality of preset RU types may include a 26-tone RU, a 52-tone RU, a 106-tone RU, and a 242-tone RU. Minimum receiver sensitivity corresponding to the RU types is shown in the following Table 1. When an RU type is the 26-tone RU, that is, a corresponding bandwidth is 2 MHz, minimum receiver sensitivity of the AP device may be −91 dBm. In this case, the preset threshold range 1 may be [−88 dBm, −91 dBm). When an RU type is the 52-tone RU, that is, a corresponding bandwidth is 5 MHz, minimum receiver sensitivity that is set for the AP device may be −88 dBm. In this case, the preset threshold range 1 may be [−85 dBm, −88 dBm). When an RU type is the 106-tone RU, that is, a corresponding bandwidth is 10 MHz, minimum receiver sensitivity that is set for the AP device may be −85 dBm. In this case, the preset threshold range 1 may be [−82 dBm, −−85 dBm). When an RU type is the 242-tone RU, that is, a corresponding bandwidth is 20 MHz, minimum receiver sensitivity that is set for the AP device may be −82 dBm. In this case, the preset threshold range 1 may be [−79 dBm, −82 dBm). In this way, when the received signal strength indicator of the STA device has not decreased to minimum receiver sensitivity of the AP device in a current bandwidth, that is, when the RSSI of the STA device has not been a critical value, the AP device may perform S204 to allocate an RU with a smaller bandwidth to the STA device. Therefore, when transmit power of the STA device remains unchanged, power spectrum density can be enhanced, and a receiver sensitivity requirement of the AP device can be reduced, so that a Wi-Fi signal coverage distance in an uplink direction is longer, and a signal coverage area of a Wi-Fi device is larger, thereby preventing the AP device from receiving no signal sent by the STA device, and preventing the STA device from being offline.

TABLE 1

| Coding/ Decoding type | Bit rate | RU type | Band- width (MHz) | Minimum receiver sensitivity (dBm) |
| --- | --- | --- | --- | --- |
| Binary phase shift keying (binary phase shift keying, BPSK) | 1/2 | 242-tone RU | 20 | −82 |
| BPSK | 1/2 | 106-tone RU | 10 | −85 |
| BPSK | 1/2 | 52-tone RU | 5 | −88 |
| BPSK | 1/2 | 26-tone RU | 2 | −91 |

Certainly, the preset threshold range 1 may be alternatively set to another value. This is not specifically limited in this embodiment of this application.

In another embodiment of this application, in S203, when a representation parameter of the uplink channel quality is the received signal strength indicator of the STA device, the first preset condition may be that the RSSI of the STA device is lower than the preset threshold 1. Herein, the AP device may set the preset threshold 1. When the RSSI of the STA device is lower than the preset threshold range 1, the AP device may allocate a frequency domain resource of a resource type with a smallest bandwidth in a plurality of preset resource types to the STA device as the target frequency domain resource. For example, it is assumed that a frequency domain resource is an RU, and the preset threshold 1 may be −82 dBm. In this case, if the AP device detects that a value of the uplink RSSI of the STA device is −86 dBm, that is, the value of the uplink RSSI is lower than the preset threshold 1, the AP device may perform S204 to allocate an RU of an RU type that corresponds to a smallest bandwidth in a plurality of preset RU types: a 26-tone RU, a 52-tone RU, a 106-tone RU, and a 242-tone RU, namely, the 26-tone RU, to the STA device as the target RU. Alternatively, if a plurality of preset RU types are a 52-tone RU, a 106-tone RU, and a 242-tone RU, the AP device may perform S204 to allocate an RU of an RU type that corresponds to a smallest bandwidth in the preset 52-tone RU, 106-tone RU, and 242-tone RU, namely, the 52-tone RU, to the STA as the target RU. Certainly, in another embodiment of this application, the preset threshold 1 may be alternatively another value. This is not specifically limited in this application.

In another embodiment of this application, the first preset condition may be alternatively that the packet loss rate or the bit error rate of the downlink packet exceeds a preset threshold. Herein, after the AP device sends a downlink packet to the STA device, the STA device sends an acknowledgment message to the AP device, to notify the AP device of data received by the STA device. However, when the uplink channel quality is relatively poor, the AP device possibly cannot receive the acknowledgment message sent by the STA device. In this case, the AP device considers that the downlink packet sent this time is lost or incorrectly decoded. Therefore, the AP device can determine a packet loss rate or a bit error rate of the downlink packet, to further determine whether the packet loss rate or the bit error rate of the downlink packet meets the preset condition. If the packet loss rate or the bit error rate of the downlink packet exceeds the preset threshold 2 (for example, 20%), it can indicate that current uplink channel quality of the STA device is very poor, but the STA device is still online. In this case, the AP device may perform S204 to allocate an RU with a smaller bandwidth to the STA device, to enhance power spectrum density, and reduce a receiver sensitivity requirement of the AP device, so that a Wi-Fi signal coverage distance in an uplink direction is longer, and a signal coverage area of a Wi-Fi device is larger, thereby preventing the AP device from receiving no signal sent by the STA device, and preventing the STA device from being offline.

Certainly, the preset threshold 2 may be alternatively 15%, 30%, 40%, or the like, and the preset threshold 2 may be an empirical value. This is not specifically limited in this embodiment of this application.

In this embodiment of this application, the target RU may be an RU in one basic channel element (for example, a channel of a 22 MHz bandwidth), that is, a bandwidth of the target RU is less than or equal to the bandwidth of one basic signal element.

When the downlink channel quality of the STA device meets the first preset condition, the AP device allocates an RU to the STA device in one basic channel element. First, the AP device determines, based on the uplink channel quality, for example, the received signal strength indicator of the STA device, whether the received signal strength indicator of the STA device falls within the preset threshold range 1. If yes, the AP device allocates an RU of an RU type corresponding to the preset threshold range 1 to the STA device as the target RU. For example, the preset threshold range 1 is [−82 dBm, −85 dBm). First, the AP device detects that the received signal strength indicator of the STA device is −83 dBm. In this case, the received signal strength indicator of the STA device falls within the preset threshold range 1, and the AP device allocates a 106-tone RU to the STA device as the target RU. A bandwidth of the new RU allocated by the AP device to the STA device is smaller than a bandwidth of a current RU of the STA device, that is, the AP device allocates a narrower uplink channel to the STA device. Therefore, when transmit power of the STA device remains unchanged, power spectrum density can be enhanced, and a receiver sensitivity requirement of the AP device can be reduced, so that a Wi-Fi signal coverage distance in an uplink direction is longer, and a signal coverage area of a Wi-Fi device is larger, thereby preventing the AP device from receiving no signal sent by the STA device, and preventing the STA device from being offline.

Alternatively, the AP device may determine, based on the packet loss rate or the bit error rate of the downlink packet, whether the packet loss rate or the bit error rate of the downlink packet exceeds the preset threshold 1. If yes, the AP device determines a target RU type from a plurality of preset RU types, and allocates an RU of the target RU type to the STA device as the target RU. Herein, a bandwidth of the target RU type is less than only a bandwidth corresponding to a current RU type of the STA device. For example, if the preset threshold 1 is set to 20%, and the current RU type of the STA device is a 242-tone RU, the AP device first detects that the packet loss rate or the bit error rate of the downlink packet is 25%, that is, the AP device determines that the packet loss rate or the bit error rate of the downlink packet exceeds 20%. In this case, the AP device determines, as the target RU, a 106-tone RU whose bandwidth is less than only that of the 242-tone RU, and allocates the 106-tone RU to the STA device as the target RU, that is, the AP device allocates a narrower uplink channel to the STA device. Therefore, when transmit power of the STA device remains unchanged, power spectrum density can be enhanced, and a receiver sensitivity requirement of the AP device can be reduced, so that a Wi-Fi signal coverage distance in an uplink direction is longer, and a signal coverage area of a Wi-Fi device is larger, thereby preventing the AP device from receiving no signal sent by the STA device, and preventing the STA device from being offline. Certainly, when the current RU type of the STA device is a 106-tone RU, the AP device may determine a 52-tone RU as the target RU type; or when the current RU type of the STA device is a 52-tone RU, the AP device may determine a 26-tone RU as the target RU type. This is not specifically limited in this application.

In another embodiment of this application, the AP device may alternatively allocate the target RU to the STA device based on whether the signal-to-noise ratio of the uplink channel of the STA device is lower than the preset threshold 2. In this case, the preset threshold 2 may be an empirical value. This is not specifically limited in this embodiment of this application.

S204: The AP device sends a notification message to the STA device.

The notification message is used to indicate the STA device to send an uplink packet to the AP device by using the target RU.

Figure 3:
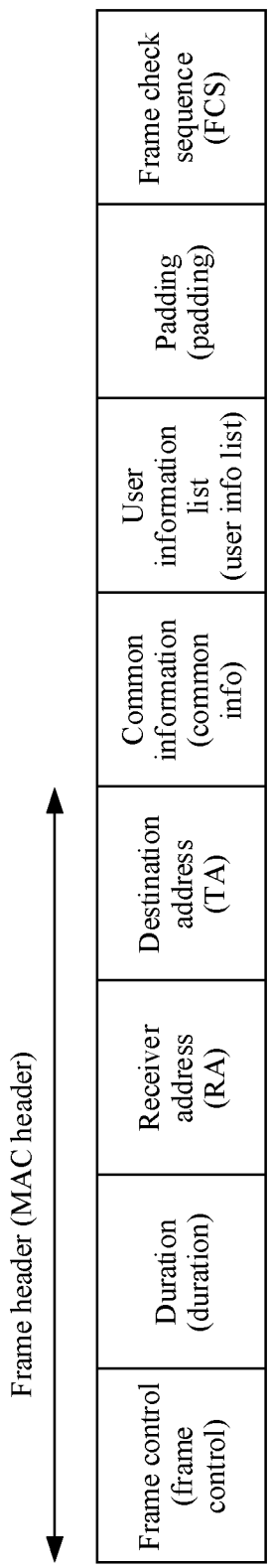
FIG. 3 is a schematic diagram of a frame structure of a trigger frame according to an embodiment of this application.

In this embodiment of this application, in the 802.11ax standard, the notification message may be implemented in a form of a trigger frame (trigger frame). FIG. 3 is a schematic diagram of a frame structure of a trigger frame according to an embodiment of this application. Referring to FIG. 3, in the 802.11ax standard, the trigger frame includes a "user information list (user info list)" field, and each STA device corresponds to one user info field. FIG. 4 is a schematic diagram of a user info field according to an embodiment of this application. Referring to FIG. 4, user info includes an "RU allocation (RU Allocation)" field, and RU allocation is used to describe an RU type that needs to be used by the STA device and a frequency location occupied by a target RU of the RU type.

In this embodiment of this application, user info further includes an uplink MCS (UL MCS) field. UL MCS is used to indicate a modulation and coding type that needs to be used by the STA device, and UL MCS may further indicate a Wi-Fi rate that needs to be used by the STA device. User info further includes an uplink dual carrier modulation (up-link dual carrier modulation, UL DCM) field. UL DCM specifies whether the STA device uses the dual carrier modulation.

Certainly, the trigger frame may further carry another field to indicate other information. This is not specifically limited in this embodiment of this application. Optionally, the notification message may be implemented by using a customized message in the 802.11ax standard, or may be implemented by using a notification message negotiated by the AP device with the STA device in advance. This is not specifically limited in this application.

S205: The STA device sends, in response to the notification message, an uplink packet to the AP device by using the target RU allocated by the AP device.

The uplink packet may include a data type packet, a management type packet, and/or a control type packet specified in the 802.11ax standard.

After receiving the notification message, for example, a trigger frame, sent by the AP device, the STA device parses the trigger frame to obtain an RU allocation field, a UL MSC field, a UL DCM field, and the like, and sends the uplink packet to the AP device on the target RU based on indications of these fields by using specified configuration information such as a modulation and coding scheme and a bit rate.

In this embodiment of this application, because the bandwidth of the target RU is relatively small, if a to-be-sent uplink packet of the STA device is relatively large, the STA device may need to fragment the to-be-sent uplink packet. Specifically, after obtaining the RU allocation field, the STA device may determine a length of a single-time schedulable packet based on an RU type of the target RU allocated by the AP device to the STA device. Then, the STA device compares a length of the to-be-sent uplink packet with the length of the single-time schedulable packet. If the length of the to-be-sent packet is greater than the length of the single-time schedulable packet, the STA device fragments the to-be-sent uplink packet, and sends a packet fragment to the AP device by using the target RU. If the length of the to-be-sent uplink packet is less than or equal to the length of the single-time schedulable packet, that is, the STA device can send a complete uplink packet at one time, the STA device may directly send the entire uplink packet on the target RU without fragmentation.

In this embodiment of this application, a preamble part of the uplink packet needs to be sent to the AP device by using one basic channel element. However, when the uplink channel quality of the STA device meets the first preset condition, the AP device possibly cannot obtain the preamble part, and therefore cannot correctly parse the uplink packet. To obtain the uplink packet sent by the STA device by using the target RU, when performing S205, the AP device specifies configuration information such as a UL MCS and UL DCM for the STA device by using the notification message. In this way, the AP device can directly obtain the uplink packet on the target RU through parsing based on the configuration information without parsing the preamble part of the uplink packet, to ensure transmission reliability of the uplink packet.

In this embodiment of this application, after receiving the uplink packet sent by the STA device by performing S205, the AP device may determine whether the received uplink packet is the last fragment of the to-be-sent uplink packet. If yes, it indicates that the STA device has sent the entire to-be-sent uplink packet. In this case, the AP device may send a notification message to the STA device, to determine whether the STA device further has a to-be-sent uplink packet. Simultaneously, the STA device may further continue to perform S202 to detect uplink channel quality of the STA device, to detect current uplink channel quality of the STA device. If the AP device detects that the uplink channel quality is improved, that is, the uplink channel quality meets a second preset condition, the AP device performs the following S601 to S603. On the contrary, the AP device may continue to perform S202 to continue to detect uplink channel quality of the STA device. This is repeated until detected uplink channel quality meets the second preset condition, and then the following S601 to S603 are performed.

In another embodiment, after receiving the notification message, if no packet needs to be sent, the STA device sends an empty packet to the AP device by using the target RU. If the uplink packet received by the AP device is empty, the AP device determines that the STA device completes sending of the to-be-sent uplink packet. In this case, the AP device may prolong a sending period of the notification message, and send the notification message to the STA device again based on a prolonged sending period. In actual application, the sending period of the notification message has an upper limit value, for example, 25 ms or 50 ms. In this case, after prolonging the sending period of the notification message to the upper limit value, the AP device keeps sending the notification message to the STA device by using the upper limit value as a sending period. If the AP device detects that the uplink channel quality of the STA device is improved, that is, meets the second preset condition, the AP device stops prolonging the sending period of the notification message.

In another embodiment of this application, if the uplink packet received by the AP device is not the last fragment of the to-be-sent uplink packet, it indicates that the to-be-sent uplink packet has not been completely sent. In this case, after receiving the uplink packet, the AP device may immediately perform S204 to send the notification message, namely, the trigger frame, to the STA device, to schedule the STA device to send a next packet fragment.

It should be noted that the second preset condition may be a condition other than the first preset condition, or it may be considered that, that the uplink channel quality meets the second preset condition may indicate that the uplink channel quality does not meet the first preset condition. For example, the second preset condition includes at least one of the following: received signal strength indicator of the STA device falls within a preset threshold range 2, a packet loss rate of a downlink packet sent by the AP device to the STA device or a bit error rate of the downlink packet is less than or equal to a preset threshold 3, or a signal-to-noise ratio of the uplink channel of the STA device is greater than or equal to a preset threshold 4.

In actual application, the preset threshold range 1 and the preset threshold range 2 are different threshold ranges, and the preset threshold range 2 may be a complementary set of the preset threshold range 1; the preset threshold 3 may be the same as or different from the preset threshold 1; and the preset threshold 4 may be the same as or different from the preset threshold 2. This is not specifically limited in this application.

In this embodiment of this application, when detecting that the uplink channel quality is relatively poor, the AP device allocates a specified target RU to the STA device, where the target RU is at least a part of one basic channel element, that is, the AP device allocates an RU with a smaller bandwidth to the STA device, so that the STA device can send an uplink packet on the specified target RU. Therefore, when transmit power of the STA device remains unchanged, uplink power spectrum density can be improved, and receiver sensitivity of the AP device can be reduced, thereby expanding a Wi-Fi signal coverage area.

Figure 5:
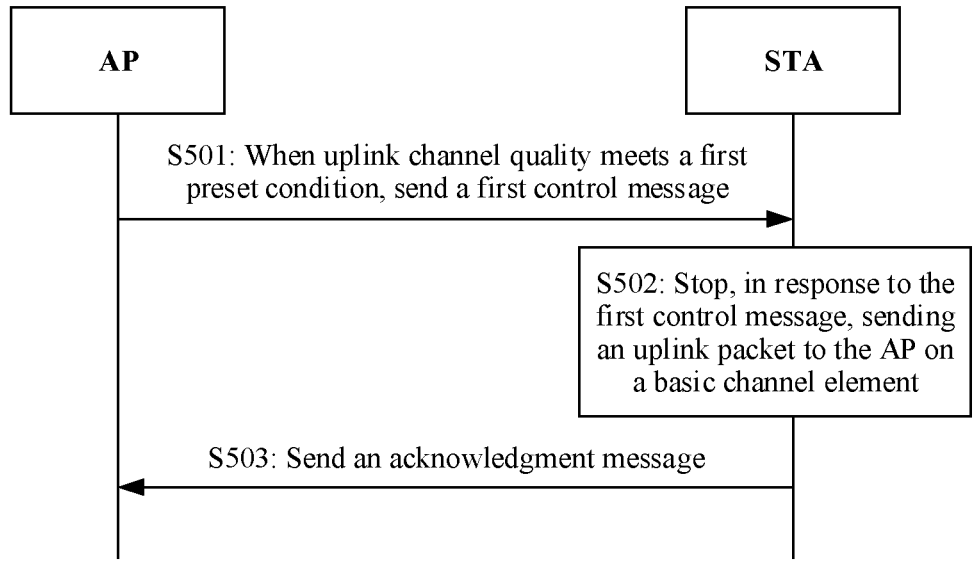
FIG. 5 is a schematic diagram of a first procedure of notifying a STA device according to an embodiment of this application.

In this embodiment of this application, after S202, when the AP device detects that the uplink channel quality of the STA device is relatively poor, in order that the STA device is ready to send an uplink packet on the target RU, when the AP device determines, after S202, that the uplink channel quality meets the first preset condition, the AP device may further notify the STA device that the STA device needs to send an uplink packet on the target RU next. FIG. 5 is a schematic diagram of a first procedure of notifying a STA device according to an embodiment of this application. Referring to FIG. 5, the method may further include the following steps:

S501: When the uplink channel quality meets the first preset condition, the AP device sends a first control message to the STA device.

S502: The STA device stops, in response to the first control message, sending an uplink packet to the AP device on the basic channel element.

S503: The STA device sends an acknowledgment message to the AP device.

In the 802.11ax standard, an operating mode is defined for the STA device as a blocking mode. When the STA device operates in the blocking mode, the STA device does not actively send an uplink packet to the AP device. In this case, when the AP device determines that the uplink channel quality meets the first preset condition, the AP device sends the first control message to the STA device, to indicate the STA device to enter the blocking mode, thereby ensuring continuity of the uplink packet sent by the STA device. Optionally, the first control message may be a customized message in the 802.11ax standard, or may be a control message negotiated by the AP device with the STA device in advance. This is not specifically limited in this embodiment of this application.

Correspondingly, after the STA device sends the uplink packet to the AP device by using S205, after the AP device determines that the entire uplink packet is received, the AP device may return to S202 to detect uplink channel quality of the STA device again, and determine whether the uplink channel quality meets the first preset condition. If yes, the AP device continues to perform S202. If no, the AP device performs the following S601.

Figure 6:
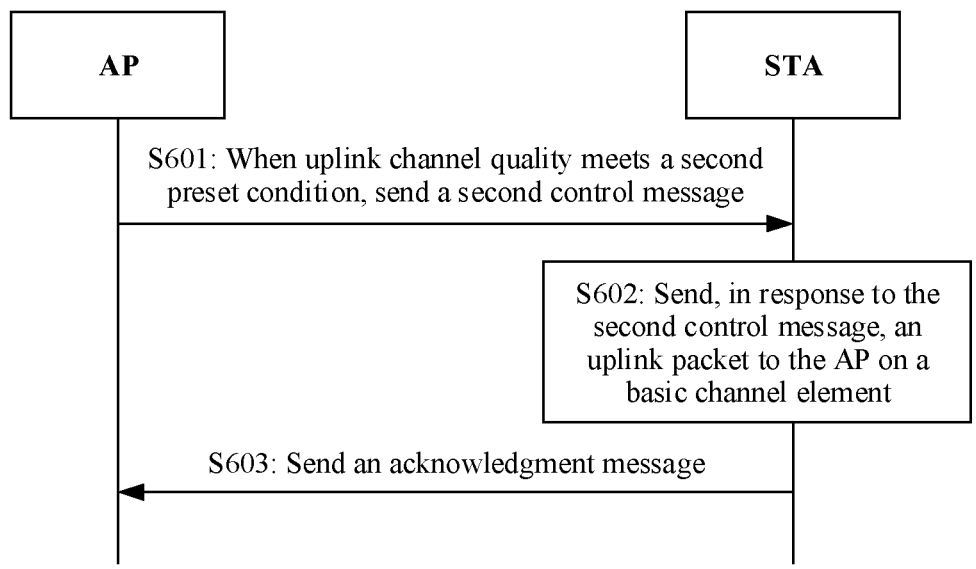
FIG. 6 is a schematic diagram of a second procedure of notifying a STA device according to an embodiment of this application.

FIG. 6 is a schematic diagram of a second procedure of notifying a STA device according to an embodiment of this application. Referring to FIG. 6, the method may further include the following steps:

S601: When the uplink channel quality meets the second preset condition, the AP device sends a second control message to the STA device.

S602: The STA device sends, in response to the second control message, an uplink packet to the AP device on the basic channel element.

S603: The STA device sends an acknowledgment message to the AP device.

After S205, if the AP device determines that the uplink channel quality meets the second preset condition, it indicates that current uplink channel quality of the STA device is relatively good. In this case, the AP device may send the second control message to the STA device, to indicate the STA device to exit the blocking mode. The second control message may be a customized message in the 802.11ax standard, or may be a control message negotiated by the AP device with the STA device in advance, provided that a format of the second control message is the same as that of the first control message. This is not specifically limited in this embodiment of this application.

In this embodiment of this application, if a frequency domain resource is sub-channels in the basic channel element, similar to the case in which a frequency domain resource is an RU in S203 and S204, for example, the AP device has different requirements for minimum receiver sensitivity (unit: dBm) in different coding/decoding types or bit rates, or different bandwidths. It is assumed that, for example, a frequency domain resource is a sub-channel, and a plurality of preset channel types may include 2 MHz, 5 MHz, 10 MHz, and 20 MHz. Minimum receiver sensitivity corresponding to the channel types are shown in the following Table 2. When a channel type is 2 MHz, minimum receiver sensitivity of the AP device may be −91 dBm. In this case, the preset threshold range 1 may be [−88 dBm, −91 dBm). When a channel type is 5 MHz, minimum receiver sensitivity of the AP device may be −88 dBm. In this case, the preset threshold range 1 may be [−85 dBm, −88 dBm). When a channel type is 10 MHz, minimum receiver sensitivity of the AP device may be −85 dBm. In this case, the preset threshold range 1 may be [−82 dBm, −85 dBm). When a channel type is 20 MHz, minimum receiver sensitivity of the AP device may be −82 dBm. In this case, the preset threshold range 1 may be [−79 dBm, −82 dBm). In this way, when the received signal strength indicator of the STA device has not decreased to minimum receiver sensitivity of the AP device in a current bandwidth, that is, when the received signal strength indicator of the STA device has not been a critical value, the AP device may perform S204 to allocate a sub-channel with a smaller bandwidth to the STA device. Therefore, when transmit power of the STA device remains unchanged, power spectrum density can be enhanced, and a receiver sensitivity requirement of the AP device can be reduced, so that a Wi-Fi signal coverage distance in an uplink direction is longer, and a signal coverage area of a Wi-Fi device is larger, thereby preventing the AP device from receiving no signal sent by the STA device, and preventing the STA device from being offline.

TABLE 2

| Coding/Decoding type | Bit rate | Channel type (MHz) | Minimum receiver sensitivity (dBm) |
| --- | --- | --- | --- |
| BPSK | 1/2 | 20 | −82 |
| BPSK | 1/2 | 10 | −85 |
| BPSK | 1/2 | 5 | −88 |
| BPSK | 1/2 | 2 | −91 |

Certainly, the preset threshold range may be alternatively set to another value. This is not specifically limited in this embodiment of this application.

In this embodiment of this application, the first preset condition may be alternatively that the packet loss rate or the bit error rate of the downlink packet exceeds a preset threshold. Herein, after the AP device sends a downlink packet to the STA device, the STA device sends an acknowledgment message to the AP device, to notify the AP device of data received by the STA device. However, when the uplink channel quality is relatively poor, the AP device possibly cannot receive the acknowledgment message sent by the STA device. In this case, the AP device considers that the downlink packet sent this time is lost or incorrectly decoded. Therefore, the AP device can determine a packet loss rate or a bit error rate of the downlink packet, to further determine whether the packet loss rate or the bit error rate of the downlink packet meets the first preset condition. If the packet loss rate or the bit error rate of the downlink packet exceeds the preset threshold (for example, 20%), it can indicate that current uplink channel quality of the STA device is very poor, but the STA device is still online. In this case, the AP device may perform S204 to allocate a sub-channel with a smaller bandwidth to the STA device, to enhance power spectrum density, and reduce a receiver sensitivity requirement of the AP device, so that a Wi-Fi signal coverage distance in an uplink direction is longer, and a signal coverage area of a Wi-Fi device is larger, thereby preventing the AP device from receiving no signal sent by the STA device, and preventing the STA device from being offline. Certainly, the preset threshold may be alternatively 15%, 30%, 40%, or the like, and the preset threshold may be an empirical value. This is not specifically limited in this embodiment of this application.

Correspondingly, in S204 to S206, the AP device allocates a corresponding target sub-channel to the STA device, and sends the notification message to the STA device, to indicate a channel type of the target sub-channel and a start/end frequency range of the sub-channel to the STA device. Next, the STA device sends, in response to the notification message, an uplink packet to the AP device on the target sub-channel.

Optionally, the notification message sent by the AP device to the STA device may further indicate a coding type, a bit rate, and the like of the uplink packet. This is not specifically limited in this embodiment of this application.

Figure 7:
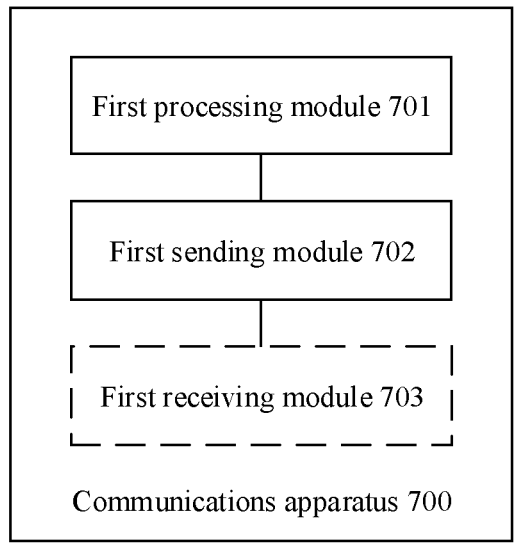
FIG. 7 is a schematic diagram of a structure of a communications apparatus according to an embodiment of this application.

Based on a same inventive concept as the foregoing method, an embodiment of this application provides a Wi-Fi communications apparatus. The Wi-Fi communications apparatus may be a chip or a system-on-a-chip in an AP device, or may be a functional module configured to implement the method in the foregoing embodiment in the AP device; and is consistent with the AP device in the foregoing embodiment. The chip or the system-on-a-chip includes a memory. The memory stores instructions. When the instructions are invoked by the system-on-a-chip or the chip, the foregoing method is performed. For example, FIG. 7 is a schematic diagram of a structure of a communications apparatus according to an embodiment of this application. Referring to solid lines in FIG. 7, a communications apparatus 700 may include: a first receiving module 701, configured to receive, by using at least one basic channel element, an uplink packet sent by a STA device; a first processing module 702, configured to: detect uplink channel quality of the STA device, and allocate a target frequency domain resource to the STA device when the uplink channel quality meets a first preset condition, where the target frequency domain resource is at least a part of one basic channel element; and a first sending module 703, configured to send a notification message to the STA device, where the notification message is used to indicate the STA device to send an uplink packet to the AP device by using the target frequency domain resource.

In some possible implementations, a representation parameter of the uplink channel quality includes: received signal strength indicator of the STA device, a packet loss rate of a downlink packet sent by the AP device to the STA device, a bit error rate of the downlink packet, or a signal-to-noise ratio of an uplink channel of the STA device, where the packet loss rate of the downlink packet or the bit error rate of the downlink packet is determined by the AP device when the AP device receives no acknowledgment message sent by the STA device.

In some possible implementations, the representation parameter of the uplink channel quality is the received signal strength indicator of the STA device, and the first processing module is specifically configured to: when the received signal strength indicator of the STA device falls within a first preset threshold range, determine a resource type corresponding to the first preset threshold range; and allocate the target frequency domain resource of the resource type to the STA device.

In some possible implementations, the representation parameter of the uplink channel quality is the packet loss rate or the bit error rate of the downlink packet, and the first processing module is specifically configured to: when the packet loss rate or the bit error rate of the downlink packet is greater than a first preset threshold, determine a target resource type from a plurality of preset resource types, where each of the plurality of resource types corresponds to a different bandwidth, and a bandwidth corresponding to the target source type is less than only a bandwidth corresponding to a current resource type of the STA device; and allocate a target frequency domain resource of the target resource type to the STA device.

In some possible implementations, the first processing module is further configured to: when the uplink channel quality meets the first preset condition, send configuration information of the target frequency domain resource to the STA device by using the notification message, where the configuration information includes at least a modulation and coding scheme MCS and/or dual carrier modulation DCM; and receiving an uplink packet sent by the STA device on the target frequency domain resource includes: paring, on the target frequency domain resource based on the configuration information corresponding to the target frequency domain resource, the uplink packet sent by the STA device.

In some possible implementations, the first receiving module is further configured to: after the first sending module sends the notification message to the STA device, receive, by using the target frequency domain resource, the uplink packet sent by the STA device; the first processing module is further configured to: when the received uplink packet is empty, prolong a sending period of the notification message; and the first sending module is further configured to send the notification message to the STA device again based on a prolonged sending period.

In some possible implementations, the first sending module is further configured to: after the first receiving module receives, by using the target frequency domain resource, the uplink packet sent by the STA device, when the received uplink packet is not the last fragment of a to-be-sent uplink packet, send the notification message to the STA device again, where the to-be-sent uplink packet is an entire packet to be sent by the STA device to the AP device.

In some possible implementations, the first sending module is further configured to: when the uplink channel quality meets the first preset condition, send a first control message to the STA device, where the first control message is used to indicate the STA device to stop sending an uplink packet to the AP device by using the at least one basic channel element; or when the uplink channel quality meets a second preset condition, send a second control message to the STA device, where the second control message is used to indicate the STA device to send an uplink packet to the AP device by using the at least one basic channel element.

In some possible implementations, the uplink packet includes a management type packet and/or a control type packet specified in the 802.11ax standard.

In some possible implementations, a resource type of the target frequency domain resource includes at least one of the following: an RU that includes 26 subcarriers, an RU that includes 52 subcarriers, an RU that includes 106 subcarriers, or an RU that includes 242 subcarriers.

It should be noted that the first sending module may be a sending interface, a sending circuit, a transmitter, or the like, the first receiving module may be a receiving interface, a receiving circuit, a receiver, or the like, and the first processing module may be one or more processors.

Figure 8:
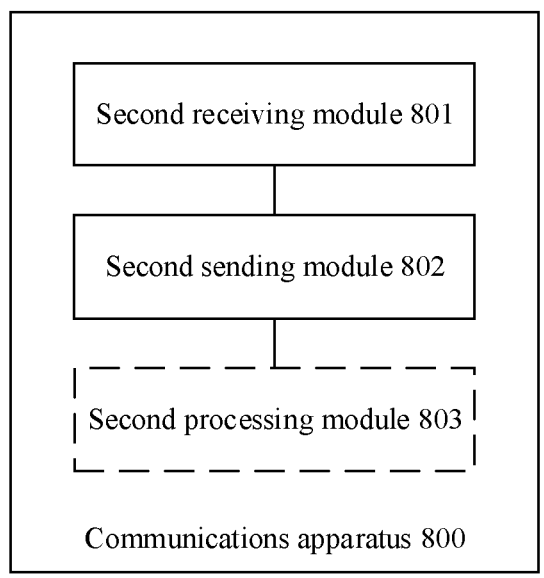
FIG. 8 is a schematic diagram of another structure of a communications apparatus according to an embodiment of this application.

Based on a same inventive concept as the foregoing method, an embodiment of this application provides a communications apparatus. The communications apparatus may be a chip or a system-on-a-chip in a STA device, or may be a functional module configured to implement the method in the foregoing embodiment in the STA device; and is consistent with the STA device in the foregoing embodiment. The chip or the system-on-a-chip includes a memory. The memory stores instructions. When the instructions are invoked by the system-on-a-chip or the chip, the foregoing method is performed. For example, FIG. 8 is a schematic diagram of another structure of a communications apparatus according to an embodiment of this application. Referring to solid lines in FIG. 8, a communications apparatus 800 may include: a second sending module 801, configured to send an uplink packet to an AP device by using at least one basic channel element; and a second receiving module 802, configured to receive a notification message sent by the AP device, where the second sending module 801 is further configured to: send, in response to the notification message, an uplink packet to the AP device by using a target frequency domain resource allocated by the AP device, where the target frequency domain resource is at least a part of one basic channel element.

In some possible implementations, the apparatus further includes: a second processing module 803, configured to: calculate a length of a single-time schedulable packet based on a resource type of the target frequency domain resource; and when a length of a to-be-sent uplink packet is greater than the length of the single-time schedulable packet, fragment the to-be-sent uplink packet; and the second sending module is further configured to send a packet fragment to the AP device by using the target frequency domain resource.

In some possible implementations, the second receiving module is further configured to receive a first control message sent by the AP device; and the second sending module is further configured to stop, in response to the first control message, sending an uplink packet to the AP device by using the at least one basic channel element.

The second receiving module is configured to receive a second control message sent by the AP device; and the second sending module is further configured to send, in response to the second control message, an uplink packet to the AP device by using the at least one basic channel element.

In some possible implementations, the uplink packet includes a management type packet and/or a control type packet specified in the 802.11ax standard.

In some possible implementations, a resource type of the target frequency domain resource includes at least one of the following: an RU that includes 26 subcarriers, an RU that includes 52 subcarriers, an RU that includes 106 subcarriers, or an RU that includes 242 subcarriers.

It should be noted that the second sending module may be a sending interface, a sending circuit, a transmitter, or the like, the second receiving module may be a receiving interface, a receiving circuit, a receiver, or the like, and the second processing module may be one or more processors.

Based on a same inventive concept as the foregoing method, an embodiment of this application provides an AP device, consistent with the AP device in the foregoing embodiment. The AP device may include a processor and a communications interface. The processor is coupled to a memory and is configured to read and execute instructions in the memory, to implement the communication method according to any one of the foregoing embodiments. The communications interface is configured to communicate with a STA device.

In some possible implementations, the AP device further includes the memory, configured to store necessary computer-executable instructions and data of the AP device. When the AP device runs, the processor executes the computer-executable instructions stored in the memory, to enable the AP device to perform the communication method according to the foregoing embodiment.

Based on a same inventive concept as the foregoing method, an embodiment of this application provides a STA device, consistent with the STA device in the foregoing embodiment. The STA device may include a processor and a communications interface. The processor is coupled to a memory and is configured to read and execute instructions in the memory, to implement the method according to any one of the foregoing embodiments. The communications interface is configured to communicate with an AP device.

In some possible implementations, the STA device further includes the memory, configured to store necessary computer-executable instructions and data of the AP device. When the AP device runs, the processor executes the computer-executable instructions stored in the memory, to enable the AP device to perform the communication method according to any one of the foregoing embodiments.

Based on a same inventive concept as the foregoing method, an embodiment of this application provides a computer-readable storage medium. The computer-readable storage medium stores instructions. When the instructions run on a computer, the communication method according to any one of the foregoing embodiments is performed.

Based on a same inventive concept as the foregoing method, this application provides a computer program or a computer program product. When the computer program or the computer program product is executed on a computer, the computer is enabled to implement the communication method according to any one of the foregoing embodiments.

A person skilled in the art can appreciate that functions described with reference to various illustrative logical blocks, modules, and algorithm steps disclosed and described in this specification may be implemented by hardware, software, firmware, or any combination thereof. If the software is used for implementation, the functions described with reference to the illustrative logical blocks, modules, and steps may be stored in or transmitted over a computer-readable medium as one or more instructions or code and executed by a hardware-based processing unit. The computer-readable medium may include a computer-readable storage medium corresponding to a tangible medium, such as a data storage medium, or any communications medium that facilitates transmission of a computer program from one place to another (for example, based on a communications protocol). In this manner, the computer-readable medium may generally correspond to: (1) a non-transitory tangible computer-readable storage medium, or (2) a communications medium, for example, a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example, and not limitation, such computer-readable storage medium may include a RAM, a ROM, an EEPROM, a CD-ROM or another optical disc storage apparatus, a magnetic disk storage apparatus or another magnetic storage apparatus, a flash memory, or any other medium that can store required program code in a form of instructions or data structures and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, and the discs reproduce data optically by using lasers. Combinations of the above should also be included within the scope of the computer-readable medium.

Instructions may be executed by one or more processors such as one or more digital signal processors (DSP), a general-purpose microprocessor, an application-specific integrated circuit (ASIC), a field programmable gate array (FPGA), or another equivalent integrated or discrete logic circuit. Therefore, a term "processor" used in this specification may mean the foregoing structure, or any other structure suitable for implementation of the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize function aspects of apparatus configured to perform the disclosed technologies, but do not necessarily require realization by different hardware units. Actually, as described above, various units may be combined into a codec hardware unit, or may be provided by using interoperable hardware units (including one or more processors described above) in combination with appropriate software and/or firmware.

In embodiments above, the descriptions in each embodiment have respective focuses. For a part that is not described in detail in an embodiment, refer to related descriptions in other embodiments.

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An access point (AP) device, comprising a processor and a communications interface, wherein the processor is coupled to a memory, the memory stores instructions, and when the instructions are executed by the processor, the AP device is caused to perform the steps of:
   receiving by using at least a first basic channel element, a first uplink packet sent by a station (STA) device;
   detecting uplink channel quality of the STA device;
   allocating a target frequency domain resource to the STA device when the uplink channel quality meets a first preset condition, wherein the target frequency domain resource is at least a part of a second basic channel element;
   sending a notification message to the STA device, wherein the notification message indicates the STA device to send a second uplink packet to the AP device by using the target frequency domain resource;
   receiving by using the target frequency domain resource, the second uplink packet sent by the STA device; and
   when the second uplink packet is empty, prolonging a sending period of the notification message, and sending the notification message to the STA device again based on a prolonged sending period.

2. The AP device according to claim 1, wherein the AP device is further caused to perform:
   sending a first control message to the STA device when the uplink channel quality meets the first preset condition, wherein the first control message indicates the STA device to stop sending the first uplink packet to the AP device by using the at least the first basic channel element.

3. The AP device according to claim 1, wherein the first preset condition comprises at least one of the following:
   received signal strength indicator of the STA device falls within a first preset threshold range,
   a packet loss rate of a downlink packet sent by the AP device to the STA device or a bit error rate of the downlink packet is greater than a first preset threshold, wherein the packet loss rate of the downlink packet or the bit error rate of the downlink packet is determined by the AP device when the AP device receives no acknowledgment message sent by the STA device, or
   a signal-to-noise ratio of an uplink channel of the STA device is less than a second preset threshold.

4. The AP device according to claim 3, wherein the second preset condition comprises at least one of the following:
   received signal strength indicator of the STA device falls within a second preset threshold range,
   a packet loss rate of a downlink packet sent by the AP device to the STA device or a bit error rate of the downlink packet is less than or equal to the first preset threshold, or
   a signal-to-noise ratio of the uplink channel of the STA device is greater than or equal to the second preset threshold,
   wherein the first preset threshold range is different from the second preset threshold range.

5. The AP device according to claim 1, wherein the AP device is further caused to perform:
   sending a second control message to the STA device when the uplink channel quality meets a second preset condition, wherein the second control message indicates the STA device to send a third uplink packet to the AP device by using the at least the first basic channel element.

6. The AP device according to claim 1, wherein a resource type of the target frequency domain resource comprises at least one of the following: a resource unit (RU) that comprises 26 subcarriers, an RU that comprises 52 subcarriers, an RU that comprises 106 subcarriers, or an RU that comprises 242 subcarriers.

7. The AP device according to claim 1, wherein the second uplink packet comprises a management type packet or a control type packet specified in the 802.11ax standard.

8. The AP device according to claim 1, wherein after the receiving by using the target frequency domain resource, the second uplink packet sent by the STA device, the AP device is further caused to perform:
   when the second uplink packet is not the last fragment of a to-be-sent uplink packet, sending the notification message to the STA device again, wherein the to-be-sent uplink packet is an entire packet to be sent by the STA device to the AP device.

9. The AP device according to claim 1, wherein the AP device is further caused to perform:
   when the uplink channel quality meets the first preset condition, sending configuration information of the target frequency domain resource to the STA device by using the notification message, wherein the configuration information comprises at least a modulation and coding scheme MCS and/or dual carrier modulation DCM; and
   parsing on the target frequency domain resource based on the configuration information corresponding to the target frequency domain resource, the second uplink packet sent by the STA device.

10. A communication method applied in an access point (AP) device, wherein the method comprises:
   receiving by using at least a first basic channel element, a first uplink packet sent by a STA device;
   detecting uplink channel quality of the STA device;
   allocating a target frequency domain resource to the STA device when the uplink channel quality meets a first preset condition, wherein the target frequency domain resource is at least a part of a second basic channel element;
   sending a notification message to the STA device, wherein the notification message indicates the STA device to send a second uplink packet to the AP device by using the target frequency domain resource;
   receiving by using the target frequency domain resource, the second uplink packet sent by the STA device; and
   when the second uplink packet is empty, prolonging a sending period of the notification message, and sending the notification message to the STA device again based on a prolonged sending period.

11. The method according claim 10, wherein the method further comprises:
   sending a first control message to the STA device when the uplink channel quality meets the first preset condition, wherein the first control message indicates the STA device to stop sending the first uplink packet to the AP device by using the at least the first basic channel element.

12. The method according to claim 10, wherein the first preset condition comprises at least one of the following:
   received signal strength indicator of the STA device falls within a first preset threshold range, a packet loss rate of a downlink packet sent by the AP device to the STA device or a bit error rate of the downlink packet is greater than a first preset threshold, wherein the packet loss rate of the downlink packet or the bit error rate of the downlink packet is determined by the AP device when the AP device receives no acknowledgment message sent by the STA device, or a signal-to-noise ratio of an uplink channel of the STA device is less than a second preset threshold.

13. The method according claim 10, wherein the method further comprises:

sending a second control message to the STA device when the uplink channel quality meets a second preset condition, wherein the second control message indicates the STA device to send a third uplink packet to the AP device by using the at least the first basic channel element.

14. The method according claim 13, wherein the second preset condition comprises at least one of the following:

received signal strength indicator of the STA device falls within a second preset threshold range, a packet loss rate of a downlink packet sent by the AP device to the STA device or a bit error rate of the downlink packet is less than or equal to the first preset threshold, or a signal-to-noise ratio of the uplink channel of the STA device is greater than or equal to the second preset threshold, wherein the first preset threshold range is different from the second preset threshold range.

15. The method according claim 10, wherein a resource type of the target frequency domain resource comprises at least one of the following: a resource unit (RU) that comprises 26 subcarriers, an RU that comprises 52 subcarriers, an RU that comprises 106 subcarriers, or an RU that comprises 242 subcarriers.

16. The method according claim 10, wherein the second uplink packet comprises a management type packet and/or a control type packet specified in the 802.11ax standard.

17. The method according claim 10, wherein after the receiving by using the target frequency domain resource, the second uplink packet sent by the STA device, the method further comprises:

when the second uplink packet is not the last fragment of a to-be-sent uplink packet, sending the notification message to the STA device again, wherein the to-be-sent uplink packet is an entire packet to be sent by the STA device to the AP device.

18. The method according claim 10, wherein the method further comprises:

when the uplink channel quality meets the first preset condition, sending configuration information of the target frequency domain resource to the STA device by using the notification message, wherein the configuration information comprises at least a modulation and coding scheme MCS and/or dual carrier modulation DCM; and parsing on the target frequency domain resource based on the configuration information corresponding to the target frequency domain resource, the second uplink packet sent by the STA device.

\* \* \* \* \*